United States Patent
Goceri et al.

(10) Patent No.: US 12,485,750 B1
(45) Date of Patent: Dec. 2, 2025

(54) VEHICLE DRIVELINE PROTECTED SYSTEM

(71) Applicant: FCA US LLC, Auburn Hills, MI (US)

(72) Inventors: Mehmet Y Goceri, Auburn Hills, MI (US); Matthew C Mervak, Auburn Hills, MI (US); Godla Sagar Naidu, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/786,955

(22) Filed: Jul. 29, 2024

(51) Int. Cl.
*B60K 28/10* (2006.01)
*B60K 28/02* (2006.01)
*B60R 22/48* (2006.01)
*B60T 7/12* (2006.01)

(52) U.S. Cl.
CPC .............. *B60K 28/10* (2013.01); *B60K 28/02* (2013.01); *B60R 22/48* (2013.01); *B60T 7/12* (2013.01); *B60R 2022/4891* (2013.01); *B60T 2220/00* (2013.01); *B60Y 2400/82* (2013.01)

(58) Field of Classification Search
CPC ........ B60K 28/10; B60K 28/02; B60R 22/48; B60R 2022/4891; B60T 7/12; B60T 2220/00
See application file for complete search history.

(56) References Cited

U.S. PATENT DOCUMENTS

| | | | | |
|---|---|---|---|---|
| 2021/0078577 | A1* | 3/2021 | Roques | B60L 3/0061 |
| 2022/0072961 | A1* | 3/2022 | Bolger | B60L 15/2009 |

FOREIGN PATENT DOCUMENTS

| | | | | | |
|---|---|---|---|---|---|
| CN | 107351820 | A | * | 11/2017 | B60K 28/10 |
| CN | 108357481 | B | * | 11/2019 | B60T 13/74 |
| CN | 111216716 | B | * | 9/2021 | B60T 7/12 |
| KR | 1020120129054 | A | * | 11/2012 | B60R 25/08 |

* cited by examiner

*Primary Examiner* — Tisha D Lewis
(74) *Attorney, Agent, or Firm* — Jeremy J. Klobucar

(57) ABSTRACT

A vehicle includes a torque generating system configured to generate torque through a driveline, a transmission, an accelerator position sensor configured to generate an accelerator pedal voltage signal indicative of a position of an accelerator pedal, and an electronic parking brake (EPB). A torque control system is programmed to determine the EPB is engaged, determine a gear of the transmission is in Drive or Reverse, and apply a predetermined limit to the accelerator pedal voltage signal to thereby apply a torque limit to the torque generating system to protect the driveline while the EPB is engaged.

20 Claims, 2 Drawing Sheets

VEHICLE DRIVELINE PROTECTED SYSTEM

FIELD

The present application relates generally to vehicle torque control and, more particularly, to vehicle torque limitation for driveline protection.

BACKGROUND

Vehicles are propulsively powered by powertrains that include a torque generating system (e.g., an engine, electric motor(s), or combinations thereof) and a transmission system (a multi-speed automatic transmission, a torque converter, etc.) that transfers torque to a driveline system (drive/half shafts, differentials, etc.). Some vehicles are equipped with an electronic parking brake (EPB) to prevent movement of the vehicle until certain conditions are met. For example, in some vehicles, the EPB is configured to not release until the driver buckles their seat belt. However, if the driver attempts to accelerate the vehicle while the EPB is engaged, excessive torque may be delivered to the driveline and potentially cause damage thereto. Accordingly, while such vehicle systems do work for their intended purpose, there is a desire for improvement in the relevant art.

SUMMARY

In accordance with one example aspect of the invention, a vehicle is provided. In one exemplary implementation, the vehicle includes a torque generating system configured to generate torque through a driveline, a transmission, an accelerator position sensor configured to generate an accelerator pedal voltage signal indicative of a position of an accelerator pedal, and an electronic parking brake (EPB). A torque control system is programmed to determine the EPB is engaged, determine a gear of the transmission is in Drive or Reverse, and apply a predetermined limit to the accelerator pedal voltage signal to thereby apply a torque limit to the torque generating system to protect the driveline while the EPB is engaged.

In addition to the foregoing, the described vehicle may include one or more of the following features: a passenger restraint system, wherein the EPB is engaged if the passenger restraint system is unsecured; wherein the passenger restraint system is a driver seat belt; a transfer case, wherein the torque control system is further programmed to determine if the transfer case is in a four-wheel-drive low (4LO) gear; and wherein the torque control system is further programmed to apply a first predetermined limit to the accelerator pedal voltage signal if the transfer case is not in the 4LO gear, and apply a second predetermined limit to the accelerator pedal voltage signal if the transfer case is in the 4LO gear.

In addition to the foregoing, the described vehicle may include one or more of the following features: wherein the second predetermined limit is greater than the first predetermined limit due to more torque being generated in the 4LO gear than when not in the 4LO gear; and wherein the torque control system is further programmed to determine if the transfer case is in neutral, and apply the predetermined limit to the accelerator pedal voltage signal if the EPB is engaged, the transmission is in the Drive or Reverse gear, and the transfer case is not in neutral.

In addition to the foregoing, the described vehicle may include one or more of the following features: wherein the accelerator position sensor comprises first and second accelerator position sensors each configured to generate a raw accelerator pedal voltage signal indicative of a position of the accelerator pedal, wherein the torque control system is further configured to rationalize the raw accelerator pedal voltage signals to determine a delta accelerator pedal voltage signal, which is converted into a driver torque request, and override the delta accelerator pedal voltage signal and apply the predetermined limit to the delta accelerator pedal voltage signal when the EPB is engaged and the transmission is in the Drive or Reverse gear.

In accordance with another example aspect of the invention, a method of limiting torque in a vehicle having a torque generating system configured to generate torque through a driveline is provided. In one exemplary implementation, the method includes monitoring, by a controller, an electronic parking brake (EPB) to determine if the EPB is engaged; monitoring, by the controller, a transmission to determine if a gear of the transmission is in Drive or Reverse; receiving, by the controller, an accelerator pedal voltage signal indicative of a position of an accelerator pedal of the vehicle; and applying, by the controller, a predetermined limit to the accelerator pedal voltage signal to thereby apply a torque limit to the torque generating system to protect the driveline while the EPB is engaged.

In addition to the foregoing, the described method may include one or more of the following features: wherein the vehicle includes a passenger restraint system, the method further including engaging, by the controller, the EPB if the passenger restraint system is unsecured; wherein the passenger restraint system is a driver seat belt; monitoring, by the controller, a transfer case of the vehicle to determine if the transfer case is in a four-wheel-drive low (4LO) gear; applying, by the controller, a first predetermined limit to the accelerator pedal voltage signal if the transfer case is not in the 4LO gear; and applying, by the controller, a second predetermined limit to the accelerator pedal voltage signal if the transfer case is in the 4LO gear; and wherein the second predetermined limit is greater than the first predetermined limit due to more torque being generated in the 4LO gear than when not in the 4LO gear.

In addition to the foregoing, the described method may include one or more of the following features: determining, by the controller, if the transfer case is in neutral; and applying, by the controller, the predetermined limit to the accelerator pedal voltage signal if the EPB is engaged, the transmission is in the Drive or Reverse gear, and the transfer case is not in neutral; and wherein the accelerator position sensor comprises first and second accelerator position sensors each configured to generate a raw accelerator pedal voltage signal indicative of a position of the accelerator pedal, the method further including rationalizing, by the controller, the raw accelerator pedal voltage signals to determine a delta accelerator pedal voltage signal, which is converted into a driver torque request; and overriding, by the controller, the delta accelerator pedal voltage signal and applying the predetermined limit to the delta accelerator pedal voltage signal when the EPB is engaged and the transmission is in the Drive or Reverse gear.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration

DETAILED DESCRIPTION

As previously described, some vehicles include an electronic parking brake (EPB) to hold a vehicle in place until certain conditions are met, such as the driver pressing a button. In some vehicles, the EPB is configured to remain engaged until the driver buckles their seatbelt. However, if the driver accelerates the vehicle while the EPB is engaged, excessive torque may be delivered to the driveline and cause damage thereto. Accordingly, systems and methods are provided herein configured to detect a specific set of conditions for limiting engine torque to prevent or mitigate the possibility of driveline component damage.

In one example, a control system is configured to apply a limit to accelerator pedal sensor voltage when the transmission gear is in Drive or Reverse and the EPB is not released due to an unfastened seat belt. In this way, the torque request from a pedal press will be limited to a level such that it protects driveline components. The torque limit magnitude is large enough to be noticeable by the driver to bring attention to the unfastened seat belt condition. Moreover, the torque limit is calibratable to different values based on whether the vehicle is in four-wheel-drive LO, four-wheel-drive HI, or two-wheel-drive. The system advantageously utilizes existing signals without additional componentry, only requires an engine control module (ECM), and does not require a software change to the existing braking system module (BSM).

Figure 1:
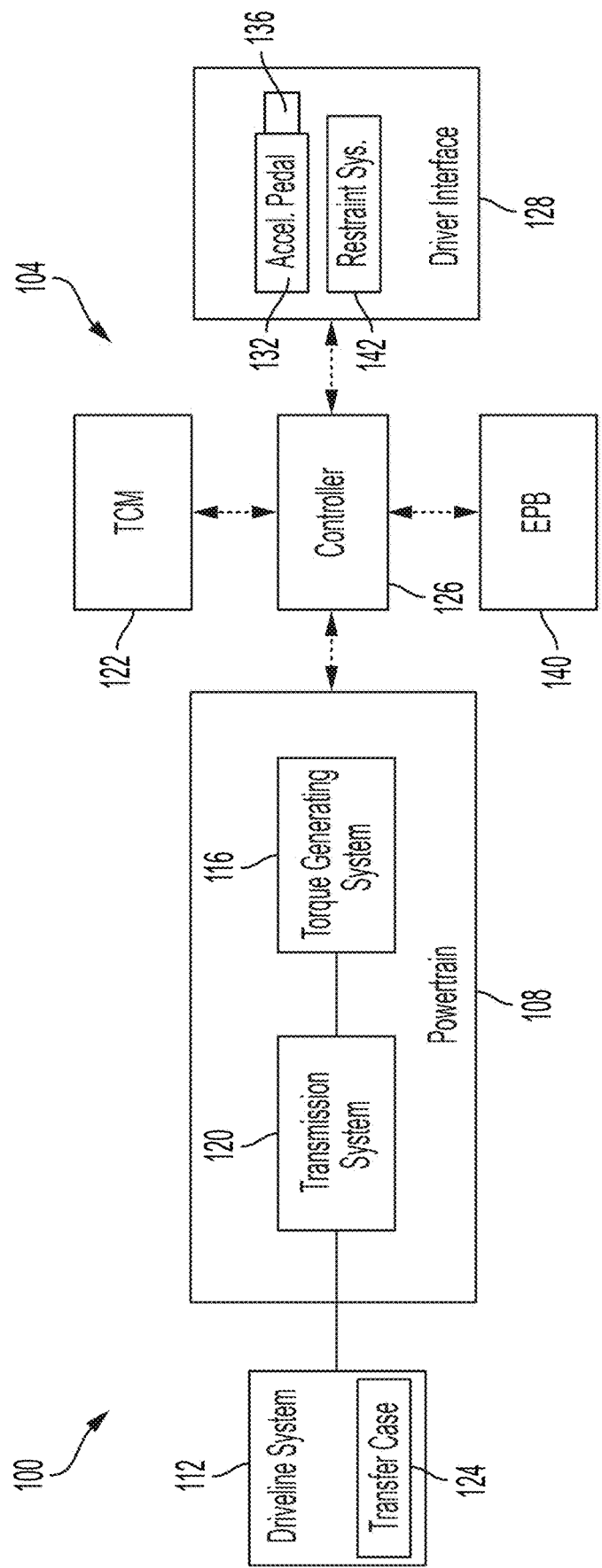
FIG. 1 is a functional block diagram of an example vehicle having a torque control system in accordance with the principles of the present application.

With initial reference to FIG. 1, a functional block diagram of a vehicle 100 having an example torque control system 104 according to the principles of the present application is illustrated. The vehicle 100 generally includes a powertrain 108 that generates and transfers torque to a driveline system 112 for vehicle propulsion. The powertrain 108 includes a torque generating system 116 and a transmission system 120. The torque generating system 116 includes an internal combustion engine (not shown) configured to combust a mixture of air and fuel (gasoline, diesel, etc.) to generate torque, one or more electric motors (not shown) powered by a high-voltage battery system (not shown) to generate torque, or a combination thereof. In other words, the vehicle 100 could be a conventional/engine-only vehicle, a hybrid electric vehicle (HEV), or an all-electric vehicle (e.g., a battery electric vehicle, or BEV).

The transmission system 120 includes a fluid coupling or torque converter (not shown) and a multi-speed automatic transmission (not shown) configured to multiply and transfer the torque to the driveline system 112. The transmission system 120 also includes a transmission control module (TCM) 122 configured to provide one or more signals indicating which vehicle transmission gear is selected (Park, Reverse, Neutral, Drive, Low, etc.). The driveline system 112 includes a plurality of driveline components (not shown), such as, but not limited to, differentials, drive/half shafts, wheels, and the like. In the illustrated example, the driveline system 112 includes a transfer case 124 configured to selectively provide four-wheel drive (4WD) or all-wheel drive (AWD) functionality to the vehicle 100, including one or more gearsets (not shown) to provide 4WD HI and 4WD LO modes.

A controller 126 (e.g., engine control module) controls operation of the vehicle 100, including primarily controlling the powertrain 108 to generate and transfer torque to the driveline system 112 to satisfy a driver torque request. The driver torque request is provided by a driver of the vehicle 100 via a driver interface 128, which includes, but is not limited to, an accelerator pedal 132 with one or more corresponding accelerator pedal position sensors 136. The driver interface 128 could also include other non-illustrated input/output devices (e.g., a touch display) that are configured such that the driver is able to customize performance parameters of the vehicle 100.

The vehicle 100 also includes an electronic parking brake (EPB) 140 and a passenger restraint system 142. The EPB 140 is configured to selectively apply a braking force to one or more vehicle wheels (not shown) to hold the vehicle 100 stationary, particularly on graded surfaces. The EPB 140 is in signal communication with the controller 126 for selective control thereof, and the driver interface 128 may include one or more buttons (not shown) for manual control of the EPB 140. The passenger restraint system 142 includes a driver seat belt and buckle (not shown) to secure the driver within the vehicle 100. The passenger restraint system 142 is in signal communication with the controller 126 and is configured to send one or more signals indicating if the driver seat belt is buckled or not. As described herein in more detail, the controller 126 is configured to maintain the EPB 140 in an engaged state if the passenger restraint system 142 indicates the driver seat belt is unbuckled.

The controller 126 is configured to control the powertrain 108 (the torque generating system 116) to provide torque to the driveline 112 based on a driver torque request via the accelerator pedal 132. The one or more accelerator pedal position sensors 136 are configured to detect a position of the accelerator pedal 132. In one example, two redundant accelerator pedal position sensors 136 each include a variable resistor that measures voltage. At a top or fully released position of the accelerator pedal 132, the sensors 136 detect a first voltage, and at a bottom or fully depressed position of the accelerator pedal 132, the sensors 136 detect a second voltage. The sensors 136 provide raw pedal voltage signals, which are utilized to determine a delta pedal voltage signal, which is a rationalized final output of the sensors to provide a redundant check on the driver torque request. Accordingly, based on the detected voltage, the controller 126 can determine the position of the accelerator pedal 132 between the fully released and fully depressed positions.

Under normal operating conditions, the controller 126 is configured to provide torque to the driveline 112 based on the driver torque request via the accelerator pedal 132. However, when the EPB 140 is engaged and the vehicle transmission gear is in Drive or Reverse, the controller 126 is configured to apply a limit to the accelerator pedal voltage from sensors 136 to reduce or prevent torque transfer through driveline 112 and damage thereto while the EPB 140 is engaged. In this way, when conditions are met, the controller 126 utilizes a rate limiter to place a limit on the voltage signal from sensors 136 to limit driveline torque.

Figure 2:
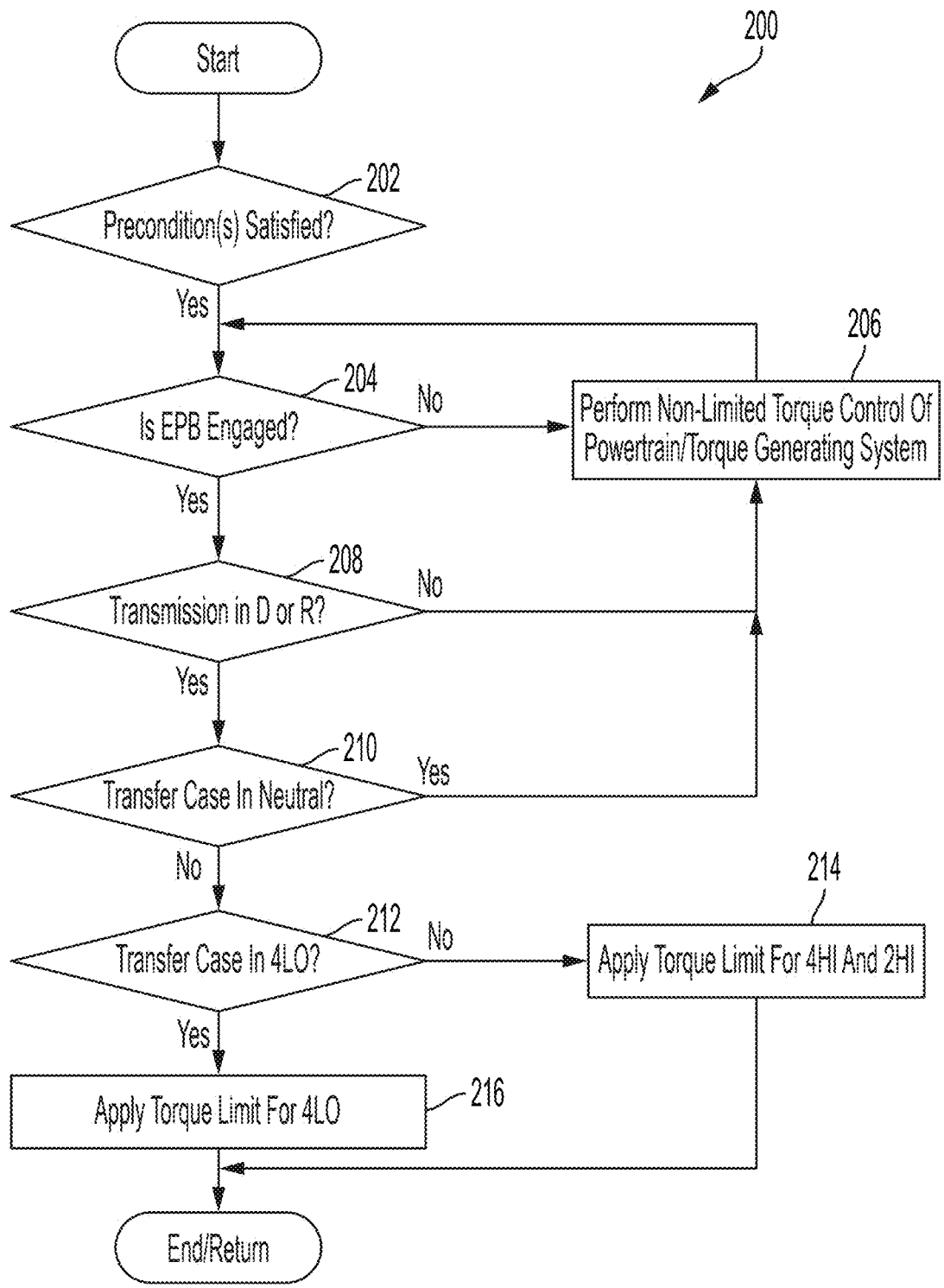
FIG. 2 is a flow diagram of an example method of limiting vehicle driveline torque while an electronic parking brake is engaged, in accordance with the principles of the present application.

Referring now to FIG. 2, a flow diagram of an example method 200 of limiting drivetrain torque when the EPB remains engaged according to the principles of the present application is illustrated. While the components of vehicle 100 are specifically referenced for illustrative/descriptive purposes, it will be appreciated that the method 200 could be applicable to any suitable vehicle. The method begins at optional 202 where the controller 126 determines whether a set of one or more preconditions are satisfied. This could include, for example only, the torque generating system 116 being powered up and running and there being no malfunctions present that would otherwise inhibit or prevent operation of the techniques of the present application (e.g., a torque-limited limp home mode being activated). If the preconditions are not satisfied, control ends or returns to 202. If the preconditions are satisfied, control proceeds to 204.

At 204, controller 126 determines if the EPB 140 is engaged, engaging, or releasing. In one example, the EPB 140 is engaged because the driver has not buckled the passenger restrain system 142. If the EPB 140 is disengaged, control proceeds to step 206 and performs normal, non-limited torque control of the powertrain 108 and torque generating system 116. However, if the EPB 140 is engaged, control proceeds to step 208 and determines if the transmission gear is in Drive or Reverse. If no, control proceeds to 206. If yes, control proceeds to 210.

At 210, controller 126 determines if the transfer case 124 is in neutral. If yes, control proceeds to 206. If no, at 212, controller 126 determines if the transfer case 124 is in 4LO. In the example implementation, controller 126 determines the status of the transfer case 124 to determine how much torque is applied and what torque limit level to apply, since operation in 4LO generates more torque than operation in 4HI and 2HI. If the transfer case 124 is not in 4LO, control proceeds to 214 and applies a first predetermined accelerator pedal voltage limit to apply a driveline torque limit when operating in 4HI or 2HI. Control then ends or returns to 204. However, if the transfer case 124 is in 4LO, control proceeds to 216 and applies a second predetermined accelerator pedal voltage limit (greater than the first limit) to thereby apply a driveline torque limit when operating in 4LO. Control then ends or returns to 204.

Described herein are systems and methods for limiting driveline torque when a vehicle EPB is engaged, for example, due to the driver seat belt being unbuckled. When control determines the EPB is engaged and the transmission gear is in Drive or Reverse, control is configured to apply a calibratable limit to accelerator pedal sensor voltage. Accordingly, if the driver presses the accelerator while the EPB is engaged, the accelerator pedal voltage limit will command a reduced torque through the driveline to prevent damage thereto.

It will be appreciated that the terms "controller" or "control system" or "module" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle comprising:
   a torque generating system configured to generate torque through a driveline;
   a transmission;
   a transfer case;
   an accelerator position sensor configured to generate an accelerator pedal voltage signal indicative of a position of an accelerator pedal;
   an electronic parking brake (EPB); and
   a torque control system programmed to:
      determine the EPB is engaged;
      determine a gear of the transmission is in Drive or Reverse;
      determine if the transfer case is in a four-wheel-drive low (4LO) gear; and
      apply a predetermined limit to the accelerator pedal voltage signal to thereby apply a torque limit to the torque generating system to protect the driveline while the EPB is engaged.

2. The vehicle of claim 1, further comprising a passenger restraint system, wherein the EPB is engaged if the passenger restraint system is unsecured.

3. The vehicle of claim 2, wherein the passenger restraint system is a driver seat belt.

4. The vehicle of claim 1, wherein the torque control system is further programmed to:
   apply a first predetermined limit to the accelerator pedal voltage signal if the transfer case is not in the 4LO gear; and
   apply a second predetermined limit to the accelerator pedal voltage signal if the transfer case is in the 4LO gear.

5. The vehicle of claim 4, wherein the second predetermined limit is greater than the first predetermined limit due to more torque being generated in the 4LO gear than when not in the 4LO gear.

6. The vehicle of claim 1, wherein the torque control system is further programmed to:
   determine if the transfer case is in neutral; and
   apply the predetermined limit to the accelerator pedal voltage signal if the EPB is engaged, the transmission is in the Drive or Reverse gear, and the transfer case is not in neutral.

7. A vehicle comprising:
   a torque generating system configured to generate torque through a driveline;
   a transmission;
   an accelerator position sensor configured to generate an accelerator pedal voltage signal indicative of a position of an accelerator pedal;
   an electronic parking brake (EPB); and
   a torque control system programmed to:

determine the EPB is engaged;
determine a gear of the transmission is in Drive or Reverse; and
apply a predetermined limit to the accelerator pedal voltage signal to thereby apply a torque limit to the torque generating system to protect the driveline while the EPB is engaged,
wherein the accelerator position sensor comprises first and second accelerator position sensors each configured to generate a raw accelerator pedal voltage signal indicative of a position of the accelerator pedal, wherein the torque control system is further programmed to:
rationalize the raw accelerator pedal voltage signals to determine a delta accelerator pedal voltage signal, which is converted into a driver torque request; and
override the delta accelerator pedal voltage signal and apply the predetermined limit to the delta accelerator pedal voltage signal when the EPB is engaged and the transmission is in the Drive or Reverse gear.

8. A method of limiting torque in a vehicle having a torque generating system configured to generate torque through a driveline, the method comprising:
monitoring, by a controller, an electronic parking brake (EPB) to determine if the EPB is engaged;
monitoring, by the controller, a transmission to determine if a gear of the transmission is in Drive or Reverse;
receiving, by the controller, an accelerator pedal voltage signal indicative of a position of an accelerator pedal of the vehicle; and
applying, by the controller, a predetermined limit to the accelerator pedal voltage signal to thereby apply a torque limit to the torque generating system to protect the driveline while the EPB is engaged,
wherein the accelerator position sensor comprises first and second accelerator position sensors each configured to generate a raw accelerator pedal voltage signal indicative of a position of the accelerator pedal, the method further comprising:
rationalizing, by the controller, the raw accelerator pedal voltage signals to determine a delta accelerator pedal voltage signal, which is converted into a driver torque request; and
overriding, by the controller, the delta accelerator pedal voltage signal and applying the predetermined limit to the delta accelerator pedal voltage signal when the EPB is engaged and the transmission is in the Drive or Reverse gear.

9. The method of claim 8, wherein the vehicle includes a passenger restraint system, the method further comprising:
engaging, by the controller, the EPB if the passenger restraint system is unsecured.

10. The method of claim 9, wherein the passenger restraint system is a driver seat belt.

11. The method of claim 8, further comprising:
monitoring, by the controller, a transfer case of the vehicle to determine if the transfer case is in a four-wheel-drive low (4LO) gear.

12. The method of claim 11, further comprising:
applying, by the controller, a first predetermined limit to the accelerator pedal voltage signal if the transfer case is not in the 4LO gear; and
applying, by the controller, a second predetermined limit to the accelerator pedal voltage signal if the transfer case is in the 4LO gear.

13. The method of claim 12, wherein the second predetermined limit is greater than the first predetermined limit due to more torque being generated in the 4LO gear than when not in the 4LO gear.

14. The method of claim 11, further comprising:
determining, by the controller, if the transfer case is in neutral; and
applying, by the controller, the predetermined limit to the accelerator pedal voltage signal if the EPB is engaged, the transmission is in the Drive or Reverse gear, and the transfer case is not in neutral.

15. The vehicle of claim 7, further comprising a passenger restraint system, wherein the EPB is engaged if the passenger restraint system is unsecured.

16. The vehicle of claim 15, wherein the passenger restraint system is a driver seat belt.

17. The vehicle of claim 7, further comprising a transfer case, wherein the torque control system is further programmed to determine if the transfer case is in a four-wheel-drive low (4LO) gear.

18. The vehicle of claim 17, wherein the torque control system is further programmed to:
apply a first predetermined limit to the accelerator pedal voltage signal if the transfer case is not in the 4LO gear; and
apply a second predetermined limit to the accelerator pedal voltage signal if the transfer case is in the 4LO gear.

19. The vehicle of claim 18, wherein the second predetermined limit is greater than the first predetermined limit due to more torque being generated in the 4LO gear than when not in the 4LO gear.

20. The vehicle of claim 17, wherein the torque control system is further programmed to:
determine if the transfer case is in neutral; and
apply the predetermined limit to the accelerator pedal voltage signal if the EPB is engaged, the transmission is in the Drive or Reverse gear, and the transfer case is not in neutral.

* * * * *